US012682891B1

(12) United States Patent
Garnaga et al.

(10) Patent No.: US 12,682,891 B1
(45) Date of Patent: Jul. 14, 2026

(54) SYSTEMS AND METHODS TO IMPLEMENT NEURAL NETWORKS THAT HAVE TRANSFORMED TO COMPUTABLE FUNCTIONS TO ENHANCE COORDINATED NATURAL LANGUAGE PROCESSING BY SERVER-CLIENT SYSTEMS

(71) Applicant: Suki AI, Inc., Redwood City, CA (US)

(72) Inventors: Valerii Garnaga, San Jose, CA (US); Nicholas Piotrowski, Northglenn, CO (US); Vamsi Reddy Chagari, Milpitas, CA (US)

(73) Assignee: Suki AI, Inc., Redwood City, CA (US)

( * ) Notice: Subject to any disclaimer, the term of this patent is extended or adjusted under 35 U.S.C. 154(b) by 212 days.

(21) Appl. No.: 18/647,216

(22) Filed: Apr. 26, 2024

(51) Int. Cl.
*G10L 15/16* (2006.01)
*G10L 15/08* (2006.01)

(52) U.S. Cl.
CPC ........ *G10L 15/16* (2013.01); *G10L 2015/088* (2013.01)

(58) Field of Classification Search
CPC ... G10L 15/16; G10L 15/1822; G10L 15/063; G10L 15/22; G10L 15/26; G10L 17/02; G10L 2015/223; G10L 15/08; G10L 15/1815; G10L 17/00; G10L 17/04; G10L 17/18; G10L 2015/088; G10L 15/30; G10L 25/30; G10L 25/51; G10L 21/10; G10L 25/27; G10L 15/07; G10L 15/075; G10L 15/14; G10L 2015/0636; G10L 25/24; G06F 40/30; G06F 16/3329; G06F 40/279; G06F 40/211; G06F 3/167; G06F 40/20; G06F 40/216; G06F 16/2474;
(Continued)

(56) References Cited

U.S. PATENT DOCUMENTS 10,832,010 B2 * 11/2020 Luke ...................... G06F 40/284
10,878,318 B2 * 12/2020 Sharifi .................. G06F 9/5044
(Continued)

OTHER PUBLICATIONS

Chen, Ricky T. Q., et al. 'Neural Ordinary Differential Equations'. arXiv [Cs.LG], 2019, (13 pages), http://arxiv.org/abs/1806.07366. arXiv.
(Continued)

*Primary Examiner* — Abdelali Serrou
(74) *Attorney, Agent, or Firm* — Esplin & Associates, PC

(57) ABSTRACT
Systems and methods to implement neural networks that have been transformed to computable functions to enhanced coordinated natural language processing and/or other processing by server/client systems are disclosed. Exemplary implementations may: obtain audio information that represents sounds conveying utterances by a user; perform analysis on the audio information to determine whether the audio information satisfies criteria for a second set of one or more processors to execute a first set of instructions on the audio information; execute the first set of instructions on the audio information to generate an instruction output responsive to determination that the audio information satisfies the criteria; determine whether the instruction output is equal to one of the output values stored in the local electronic storage; and effectuate the corresponding outcome responsive to determination that the instruction output equals one of the output values.

17 Claims, 3 Drawing Sheets

(58) Field of Classification Search
CPC .... G06F 16/248; G06F 16/252; G06F 40/295;
G06F 40/35; G06F 16/285; G06F
16/3346; G06F 16/338; G06F 16/367;
G06F 16/906; G06F 3/0482; G06F 40/16;
G06F 40/205; G06F 40/242; G06F
40/284; G06F 40/289; G06F 40/56
See application file for complete search history.

(56)                   References Cited

U.S. PATENT DOCUMENTS

| | | | | | |
|---|---|---|---|---|---|
| 11,645,494 | B1 * | 5/2023 | Kotara | .................... | G06N 3/044 |
| | | | | | 706/30 |
| 12,052,492 | B2 * | 7/2024 | Weissenberger | ....... | H04N 23/95 |
| 2018/0307950 | A1 * | 10/2018 | Nealis | ..................... | G06F 5/015 |
| 2021/0183397 | A1 * | 6/2021 | Liu | ......................... | G06Q 10/00 |
| 2021/0210075 | A1 * | 7/2021 | Kim | ...................... | G10L 15/183 |
| 2022/0044681 | A1 * | 2/2022 | Agarwal | ................. | G10L 15/22 |
| 2024/0021205 | A1 * | 1/2024 | Singh | ...................... | G10L 15/22 |
| 2024/0194178 | A1 * | 6/2024 | Austraat | ................. | G10L 15/16 |
| 2024/0201946 | A1 * | 6/2024 | Stasior | .................... | G10L 15/22 |
| 2025/0139437 | A1 * | 5/2025 | Akumu | .................. | G06N 3/082 |

OTHER PUBLICATIONS

Im, Mee Seong, and Venkat R. Dasari. 'Computational Complexity Reduction of Deep Neural Networks'. arXiv [Cs.LG], 2022, (10 pages) http://arxiv.org/abs/2207.14620. arXiv.
McCulloch, Warren S., and Walter Pitts. 'A Logical Calculus of the Ideas Immanent in Nervous Activity'. The Bulletin of Mathematical Biology, vol. 52, No. 1/2, 1990, pp. 99-115, https://www.cs.cmu.edu/~./epxing/Class/10715/reading/McCulloch.and.Pitts.pdf.
Robitaille, B., et al. 'Quasi-Newton methods for training neural networks'. Transactions on Information and Communications Technologies, vol. 2, 1993, pp. 323-335, https://www.witpress.com/Secure/elibrary/papers/AIENG93/AIENG93024FU2.pdf.

* cited by examiner

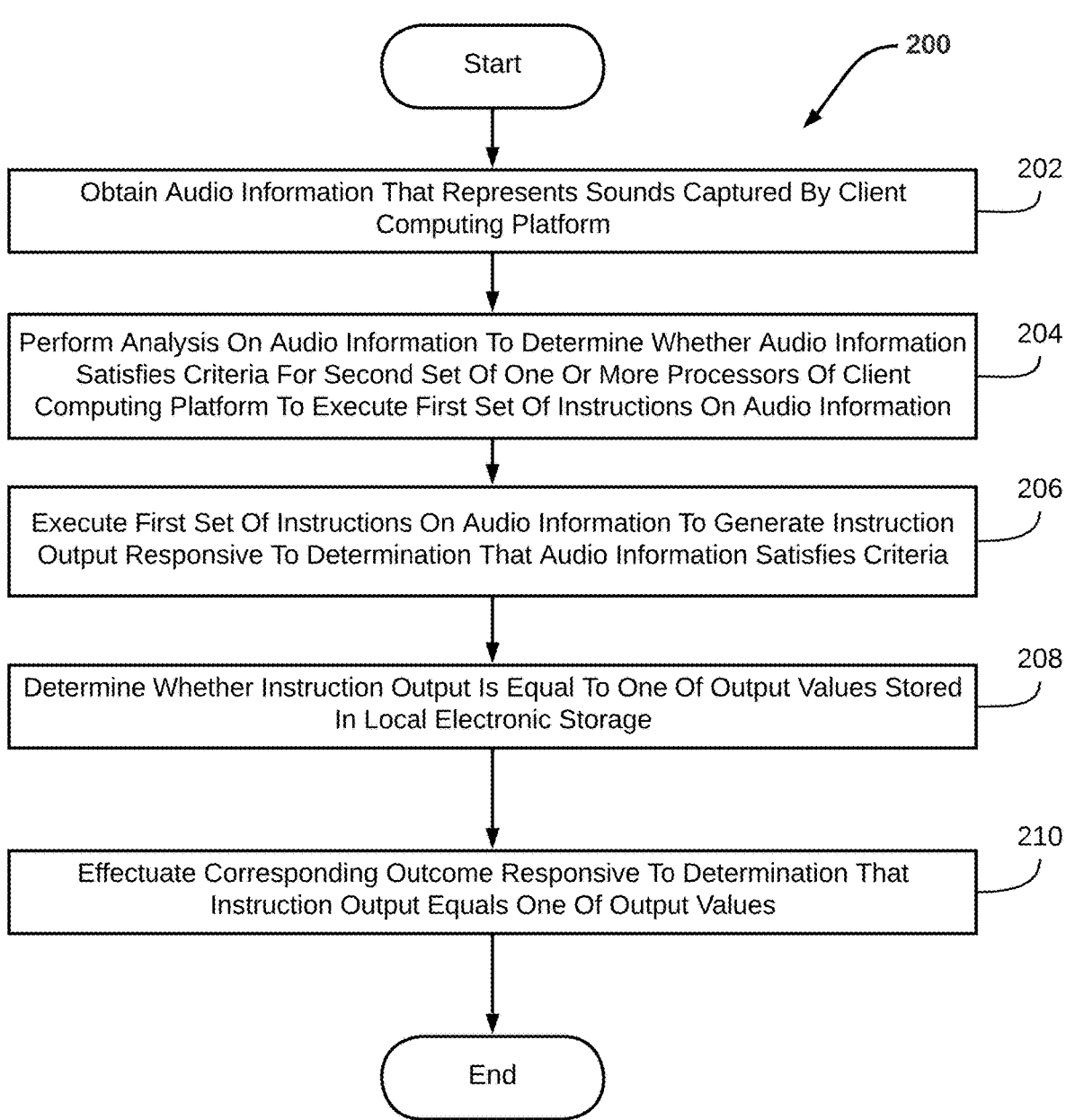

200

Start

Obtain Audio Information That Represents Sounds Captured By Client Computing Platform ⎤ 202

Perform Analysis On Audio Information To Determine Whether Audio Information Satisfies Criteria For Second Set Of One Or More Processors Of Client Computing Platform To Execute First Set Of Instructions On Audio Information ⎤ 204

Execute First Set Of Instructions On Audio Information To Generate Instruction Output Responsive To Determination That Audio Information Satisfies Criteria ⎤ 206

Determine Whether Instruction Output Is Equal To One Of Output Values Stored In Local Electronic Storage ⎤ 208

Effectuate Corresponding Outcome Responsive To Determination That Instruction Output Equals One Of Output Values ⎤ 210

End

FIG. 2

SYSTEMS AND METHODS TO IMPLEMENT NEURAL NETWORKS THAT HAVE TRANSFORMED TO COMPUTABLE FUNCTIONS TO ENHANCE COORDINATED NATURAL LANGUAGE PROCESSING BY SERVER-CLIENT SYSTEMS

FIELD OF THE DISCLOSURE

The present disclosure relates to implementing neural networks that have been transformed to computable functions to enhanced coordinated natural language processing by server/client systems.

BACKGROUND

Trained neural network models are typically stored on and employed by servers in communication with client computing platforms. Initiating the servers to employ the trained neural network models via the client computing platforms may yield slow processing times to effectuate outcomes based on input received via the client computing platforms.

SUMMARY

One aspect of the present disclosure relates to implementing neural networks that have been transformed to computable functions to enhanced coordinated natural language processing by server/client systems. The system may include electronic storage, one or more hardware processors configured by machine-readable instructions, client computing platform(s), and/or other components.

The electronic storage may store a trained neural network model and a set of output values that correspond to outcomes. The trained neural network model may generate an output value based on inputs. The client computing platform(s) may include local electronic storage that stores the first set of instructions and individual output values that correspond to individual outcomes.

The trained neural network model may include individual sets of the nodes. The individual sets of the nodes may be configured to sequentially perform different analyses to produce separate node outputs. The node outputs produced by the sets of the nodes may be input to the sets of the nodes that follow.

The nodes may include values for node parameters and function parameters. The node parameters may include at least weights and a bias. The function parameters may include operations related to the weights and the bias, one or more coefficients, and/or other function parameters.

The machine-readable instructions may include one or more instruction components. The instruction components may include computer program components. The instruction components may include one or more of instruction generating component, obtaining component, preliminary analysis component, secondary analysis component, outcome generating component, and/or other instruction components.

The instruction generating component may be configured to analyze the trained neural network model to determine node values for the node parameters applied to the given input at individual ones of the nodes in the sets.

The instruction generating component may be configured to analyze the trained neural network model to determine function values for the function parameters applied to the node values at the individual nodes.

The instruction generating component may be configured to generate, based on the node values and the function values, individual intermediate representations of the individual nodes. The intermediate representations may impartially represent the nodes and the particular analyses performed.

The instruction generating component may be configured to generate, based on the individual intermediate representations, sets of instructions in different programming languages for the individual nodes such that the sets of instructions are executable on a client computing platform. The sets of instructions may include a first set of instructions in a first programming language.

The obtaining component may be configured to obtain audio information that represents sounds conveying utterances by a user.

The preliminary analysis component may be configured to perform analysis on the audio information to determine whether the audio information satisfies criteria for the second set of one or more processors to execute the first set of instructions on the audio information.

The secondary analysis component may be configured to execute the first set of instructions on the audio information to generate an instruction output responsive to determination that the audio information satisfies the criteria. The secondary analysis component may be configured to determine whether the instruction output is equal to one of the output values stored in the local electronic storage.

The outcome generating component may be configured to effectuate the corresponding outcome responsive to determination that the instruction output equals one of the output values.

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

BRIEF DESCRIPTION OF THE DRAWINGS

FIG. 2 illustrates a method to implement neural networks that have been transformed to computable functions to enhanced coordinated natural language processing by server/client systems, in accordance with one or more implementations.

DETAILED DESCRIPTION

Figure 1:
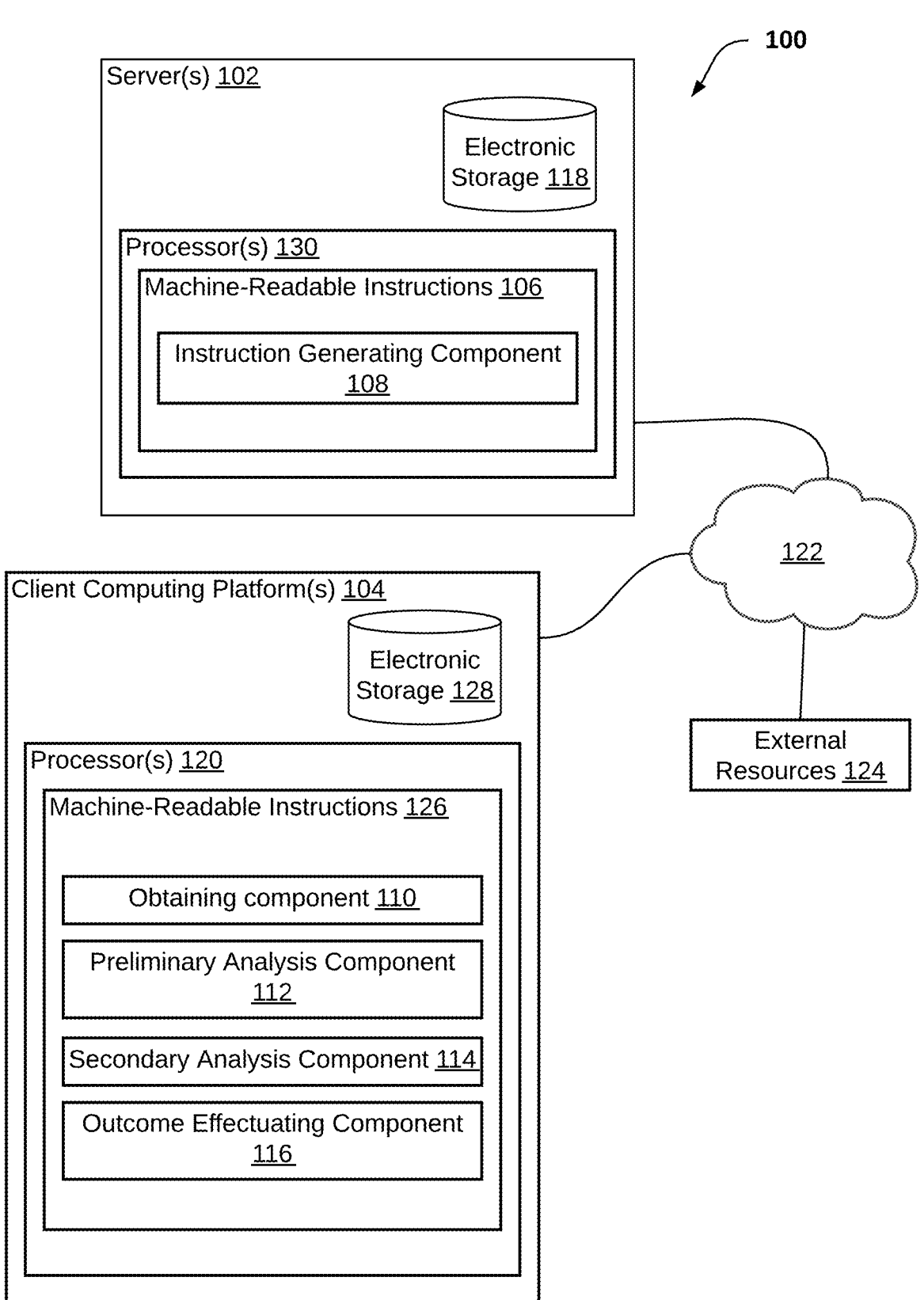
FIG. 1 illustrates a system configured to implement neural networks that have been transformed to computable functions to enhanced coordinated natural language processing by server/client systems, in accordance with one or more implementations.

FIG. 1 illustrates a system 100 configured to implement neural networks that have been transformed to computable functions to enhanced coordinated natural language processing by server/client systems, in accordance with one or more implementations. In some implementations, system 100 may include server(s) 102, electronic storage 118 included in server(s) 102, client computing platform(s) 104, electronic storage 128 included in client computing platform(s) 104, and/or other components.

Server(s) 102 may be configured to communicate with one or more client computing platforms 104 via network 122 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Electronic storage 118 may store one or more trained neural network models and one or more sets of output values associated with the one or more trained neural network models. The output values of the one or more sets may correspond to outcomes. Individual ones of the outcomes may be effectuated by employing the appropriate trained network model and utilizing the output value(s) from the trained neural network models. The outcomes may include, but are not limited to, command intake, individual commands, session initiation, session completion, and/or other outcomes. The trained neural network models described herein which may relate to natural language processing are for exemplary purposes only and are not intended to be limiting as individual ones of the trained neural network models may be trained to determine and/or generate various outputs that cause various outcomes. By way of non-limiting example, the trained neural network models may be trained for forecasting (e.g., financial, trends), content generation (e.g., text, images, videos, speech, animations), language translation, information filtering, computer vision (e.g., for entity categorization, facial recognition), diagnoses based on images, recommendation generation, and/or other trained neural network models. By way of non-limiting example, inputs to the individual trained neural network models may include audio information conveying speech (e.g., natural language), images, videos, and/or other inputs.

The command intake may enable client computing platform 104 to intake predefined or natural commands. A session that is initiated and completed may refer to a mode during which participants may converse or speak freely, and/or dictate commands within their conversation sessions. The trained neural network models may generate output values based on different inputs provided to the trained neural network models. The different inputs may include an image, a video, entity classes of individual entities, text, audio information, animations, and/or other inputs. The inputs to the individual trained neural network models may vary based on the trained neural network models themselves and the analyses and the outcomes they cause. For example, a first trained neural network model may generate transcripts for audio information that conveys speech with accents, and a second trained neural network model may generate images based on text instructions.

An entity may be a person, place, item, concept, symptom, or other entity uttered or referred to by one or more participants. The entity classes may be different sets of related features and parameters that may be uttered, and in some implementations, included in notes that summarize the conversation sessions between the participants (e.g., during a visit). The notes may include medical notes, legal notes, mechanical notes, and/or notes specific to other knowledge domains. The entity classes and notes described herein may be related to the medical knowledge domain for exemplary purposes and is not intended to be limiting. The medical knowledge domain may refer to terms, phrases, entities, literature, transcripts, values, and/or other information that are related to medicine. However, other knowledge domains may be utilized additionally or alternatively such as education, auto mechanics, among others. By way of non-limiting example, the entity classes may include at least complaints, allergies, conditions, medications, procedures, medical devices, appointments, circulatory system, and other entity classes. In some implementations, the entity classes stored may be modified by the users adding and/or removing one or more entity classes via client computing platform(s) 104.

The individual trained neural network models may include individual sets of the nodes. The individual sets of the nodes of a single trained neural network model may be configured to sequentially perform different analyses to produce separate node outputs. By way of non-limiting example, a first set of nodes may determine cadence, a second set of nodes may determine phonemes, and a third set of notes may determine words spoken. The first set of nodes may perform, followed by the second set of nodes, followed by the third set of nodes. By way of non-limiting example, the first set of nodes may output a first set of node outputs where the first set of node outputs are input to the second set of node outputs. In some implementations, the individual sets of node outputs may include one node output that represents the set of nodes, e.g., the first set of nodes. In some implementations, the individual sets of node outputs may include multiple node outputs, e.g., a node output for every node in the first set of nodes. The node output(s) produced by the individual sets of the nodes may be input to the sets of the nodes that follow. In some implementations, the one node output may be input to all the nodes in the following set of nodes, e.g., the second set of nodes. In some implementations, individual ones of the multiple node outputs may be input to particular nodes of the following set.

The nodes may include values for node parameters, function parameters, and/or other parameters. The node parameters may include at least one or more weights and a bias. The function parameters may include operations related to the weights and the bias, one or more coefficients, and/or other function parameters. A weight for a given node may represent an influence that input to the given node has on the given node's node output. The bias may cause the neural network model to positively or negatively shift to adjust output values from the individual trained neural network models. The operations may include addition, subtraction, exponentials, multiplication, division, and/or other operations. A coefficient may be number constant that is multiplied by a variable such as the input to the given node.

In some implementations, electronic storage 118 may store training information for the individual trained neural network models. The trained neural network models may be periodically or continuously trained based on the training information. In some implementations, the training information may be imported from external resource(s) 124, obtained via client computing platform(s) 104, received via network 122, and/or otherwise imported into electronic storage 118 and/or other storage accessible by server(s) 102. Periodic training may occur every day, every week, every month, or otherwise repeatedly in a consistent manner. In some implementations, the training may occur continuously responsive to obtainment and storage of new training information. In some implementations, training may occur responsive to receiving a training instruction from a user via client computing platform(s) 104.

In some implementations, electronic storage 118, 128, and/or other electronic storage may store a list of wake words, a set of commands, and/or other predefined terms or phrases. The wake words may indicate that dictation, one or more commands, and/or other utterances are to follow. In some implementations, the wake words may be fixed. In some implementations, the wake words may be modifiable such that wake words may be removed or added. In some implementations, the one or more commands may be fixed. In some implementations, the one or more commands may be modifiable such that one or more commands may be removed or added. In some implementations, the commands may be associated with a particular structure by which the commands are to be spoken in accordance with. In some implementations, the commands may be spoken naturally during conversation sessions or implied during the conversation sessions without compliance with the particular structure.

Machine-readable instructions 106 may include one or more instruction components. The instruction components may include computer program components. The instruction components may include one or more of instruction generating component 108, and/or other instruction components.

Instruction generating component 108 may be configured to analyze the individual trained neural network models to determine node values for the node parameters applied to the given input at individual ones of the nodes in the sets. That is, for the individual nodes, the node values to the node parameters may be determined. Furthermore, instruction generating component 108 may be configured to analyze the individual trained neural network models to determine function values for the function parameters applied to the node values at the individual nodes. That is, for the individual nodes, the function values to the function parameters may be determined. Such analyses may facilitate transforming the trained neural network models to delineated forms that are computable by processor(s) 120 on client computing platform(s) 104.

Based on the node values and the function values, instruction generating component 108 may be configured to generate individual intermediate representations of the individual nodes. The intermediate representations may impartially and generally represent the nodes and the particular analyses performed by the nodes. By way of non-limiting example, the intermediate representations may include deterministic equations. That is, upon providing the same given input to the intermediate representations representing the nodes of a trained neural network model, output from the trained neural network model may be the same. Thus, the output from the trained neural network model is known and predictable given the input. Such generation of the output may, therefore, be performable by client computing platform(s) 104. The individual intermediate representations may be a meticulously crafted sequence of optimized arithmetic equations. Such equations may be devised to precisely model relationships between variables (e.g., values to the node parameters, input values) and produce consistent outputs based on given inputs. These equations undergo rigorous optimization processes to enhance efficiency and accuracy, ensuring their reliability. The individual nodes, that the intermediate representations are based on, may be a fundamental computational unit in a given trained neural network model that processes and transforms input. The nodes typically encapsulate stochastic and redundant information, thus intermediate representations may be optimizations and refinements of the nodes in the trained neural network models.

Instruction generating component 108 may be configured to generate, based on the individual intermediate representations, sets of instructions in different programming languages for the individual nodes. That is, a single set of instructions may be in a particular programming language. As such, the sets of instructions may be executable on client computing platform(s) 104. In some implementations, particular client computing platforms 104 may execute instructions in particular ones of the programming languages. The programming instructions may include Python, Java, C, C++, procedural programming languages, functional programming languages, other object-oriented programming languages, logic programming languages, and/or other programming languages. By way of non-limiting example, the sets of instructions stored in electronic storage 118 may include a first set of instructions corresponding to a trained neural network model in a first programming language and a second set of instructions corresponding to a second trained neural network model in the first programming language.

In some implementations, responsive to training of the individual trained neural network models based on the training information occurring, instruction generating component 108 may re-analyze the individual trained neural network models to determine or re-confirm the node values and/or the function values, generate or update the individual intermediate representations, and subsequently determine or update the sets of instructions.

Electronic storage 128 may be similar to electronic storage 118 described herein, but included in client computing platform(s) 104. In some implementations, electronic storage 118 and electronic storage 128 may communicate via network 122 or may be the same storage media (e.g., cloud storage), and thus store the same information. Electronic storage 128 may store at least the first set of instructions and the set of output values that correspond to the outcomes.

Electronic storage 128, 118, and/or other electronic storage may store the sets of instructions in the programming languages for the individual nodes of the trained neural network models as different collections corresponding to the individual trained neural network models. By way of non-limiting example, the sets of instructions in the programming languages for the individual nodes of the trained neural network model may be stored as a first collection. The first collection may include at least the first set of instructions in the first programming language and a third set of instructions in a second programming language different than the first programming language. Electronic storage 128, 118, and/or other electronic storage may store multiple collections for the nodes of different trained neural network models.

Client computing platform(s) 104 that may be configured by machine-readable instructions 126 of processor(s) 120. Machine-readable instructions 126 may include one or more instruction components. The instruction components may include computer program components. As described herein, client computing platform(s) 104 may be similar to server(s) 102, machine-readable instructions 126 may be similar to machine-readable instructions 106, and processor(s) 120 may be similar to processor(s) 130, but executed by client computing platform(s) 104. Client computing platform(s) 104 may include less elements, more compact elements, more efficient elements, or otherwise a variation of the elements included in server(s) 102 that contribute to faster processing times of input obtained.

Machine-readable instructions 126 may include one or more instruction components. The instruction components included in machine-readable instruction 126 may include one or more of obtaining component 110, preliminary analysis component 112, secondary analysis component 114, outcome generating component 116, and/or other instruction components. In some implementations, components 110, 112, 114, and/or 116 may be included as machine-readable instructions 106, therefore the functionality of all the components are executed by server(s) 102. In some implementations, instruction generating component 108 may be included as machine-readable instructions 126, therefore the functionality of all the components is executed by client computing platform(s) 104.

Obtaining component 110 may be configured to obtain the audio information that represents sounds captured by client computing platform(s) 104. The sounds may convey utterance by the one or more participants. The sounds may convey utterances from participants during individual conversation sessions. In some implementations, the conversation sessions may be during scheduled visits. The participants in the individual conversation sessions may include the one or more caregivers, the subject, and/or other participants.

In some implementations, the audio information may be obtained in an ongoing manner. The term "ongoing manner", as used herein, may refer to continuing to perform an action (e.g., obtain) continuously or periodically (e.g., every 30 seconds, every minute, every hour, etc.) until receipt of an indication to terminate. That is, information obtaining component 108 may be continuously determining whether the audio input devices of client computing platform(s) 104 are detecting any sounds from participants.

In some implementations, the audio information may include digital audio signals that encode sounds of individual utterances of the participants, a recording of the individual utterances of the participants, and/or other audio information. In some implementations, the sounds conveying the utterances of the participants may be detected by the audio input device, such as a microphone, of client computing platform(s) 104. In some implementations, the sounds may be converted to the digital audio signals by converting analog waves to the digital audio signals by precisely measuring the analog waves at consistent and frequent intervals. The recording of the individual utterances may include a digital file of a reproduction of the digital audio signals that cause the sounds, and thus convey the utterances, the digital audio signals, and/or other recording. In some implementations, obtaining component 110 may be configured to generate the audio information based on the sounds in response to silence that follows individual ones of the utterances from the different participants, a change in the participant speaking detected, and/or user input via the user interface elements (e.g., selecting a virtual button). In some implementations, the silence may be for a particular amount of time that may be fixed or modifiable by the users. In some implementations, the audio information may be stored in electronic storage 118, 128, and/or other electronic storage in association with the subject.

Preliminary analysis component 112 may be configured to perform analysis on the audio information to determine whether the audio information satisfies criteria for the second set of one or more processors to execute the first set of instructions on the audio information. The criteria may be stored in electronic storage 128, 118, and/or other electronic storage. The criteria may include utterance of one or more of the wake words, utterance of one or more the commands, utterance of one or more of the wake words followed by one or more of the commands, utterance of one or more of the wake words followed by a pause in utterance for a particular amount of time (e.g., 2 seconds), a particular amplitude of the audio information, a particular volume of the audio information, the particular amplitude for a particular amount of time, the particular volume for a particular amount of time, a lack of background noise, and/or other criteria. The background noise may include car noise, music, other speech, computer sounds (e.g., from a computer mouse, keyboard, notifications), machines (e.g., an air conditioning unit, a fan) and/or other background noises. It is to be understood that the analysis performed by preliminary analysis component 112 may be different for the individual trained neural network models and the criteria evaluated may be different for the individual trained neural network models. By way of non-limiting example, preliminary analysis component 112 may perform analysis on one or more images, one or more videos, text, one or more textual documents, and/or other input. By way of non-limiting example, the criteria for other ones of the trained neural network models may include a particular amount of pixels, a particular file size, a particular video quality, a particular amount of historical information, and/or other criteria.

Secondary analysis component 114 may be configured to execute the first set of instructions, by way of non-limiting example, on the audio information to generate an instruction output. Execution of individual sets of instructions, such as the first set of instructions, may be responsive to determination that the audio information satisfies the criteria. The instruction output may include a number, a string, one or more characters, Boolean, an array, a multidimensional array, and/or other instruction output. The array and/or multidimensional array may include numbers, strings, characters, Boolean, and/or other values. The secondary analysis component may be configured to determine whether the instruction output is equal to one of the output values stored in electronic storage 128.

In some implementations, responsive to determination that the model output does not equal one of the output values, secondary analysis component 114 may be configured to transmit the audio information to server(s) 102 for execution by the trained neural network model itself. Determination that the model output does not equal one of the output values may indicate that the sets of instructions, such as the first set of instructions, stored on client computing platform(s) 104 may not yield instruction outputs that are usable to effectuate one of the outcomes. Thus, the instruction component(s) of server(s) 102 may effectuate the corresponding outcome responsive to output from employing the trained neural network model. Outcome generating component 116 may be configured to effectuate the corresponding outcome responsive to determination that the instruction output equals one of the output values stored in electronic storage 128. In some implementations, the instruction component(s) of server(s) 102 may be configured to determine the outcome to effectuate and subsequently effectuate client computing platform(s) 104 to effectuate such outcome.

Figure 3:
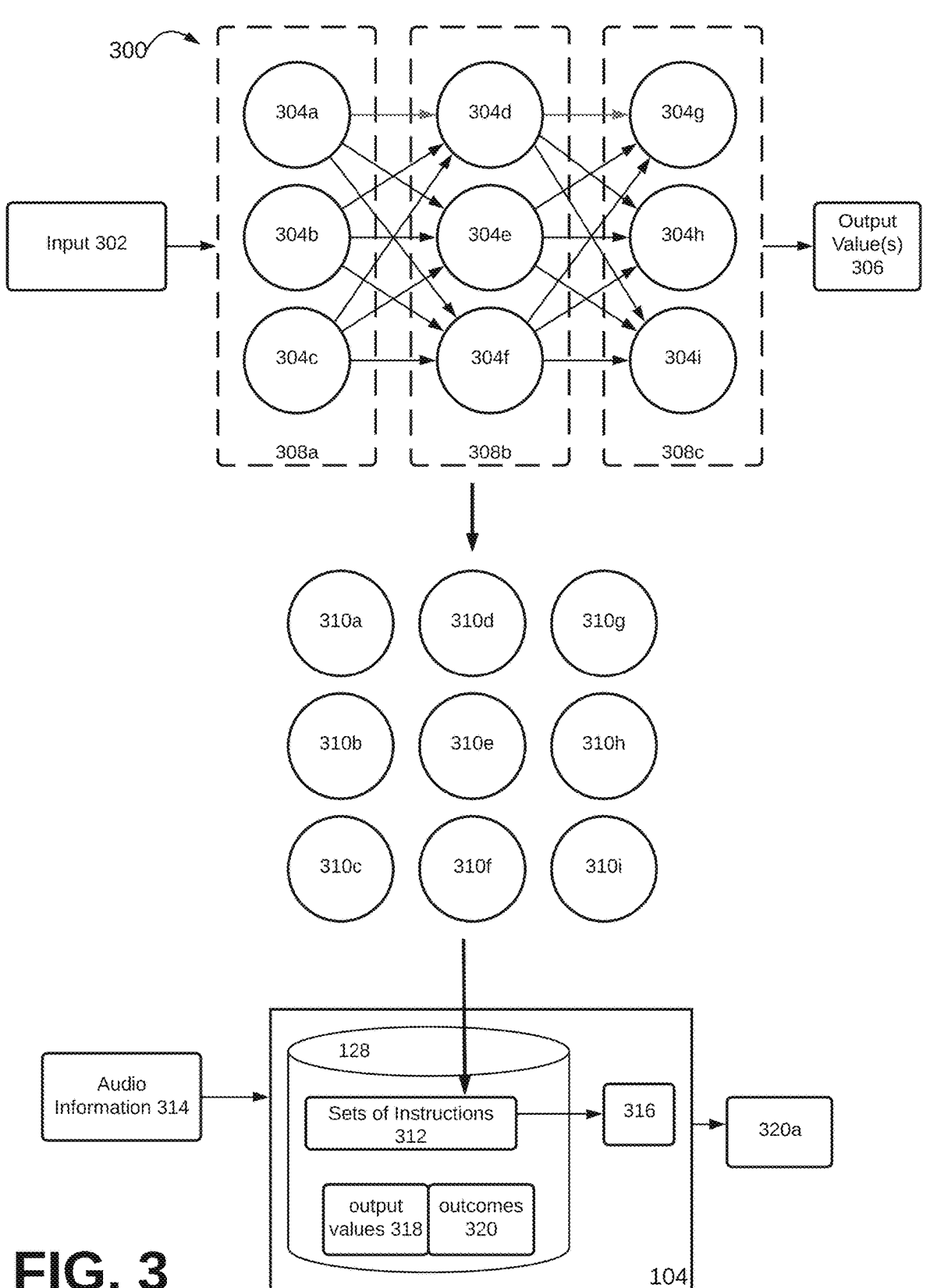
FIG. 3 illustrates an example implementation of the system configured to implement neural networks that have been transformed to computable functions to enhanced coordinated natural language processing by server/client systems, in accordance with one or more implementations.

FIG. 3A illustrates trained neural network model 300 that is comprised of nodes 304*a-i*. Nodes 304*a-i* may be organized into sets so that set 308*a* includes nodes 304*a-c*, set 308*b* includes nodes 304*d-f*, set 308*c* includes nodes 304*g-i*. Set 308*a* may be perform a first analysis, set 308*b* may perform a second analysis, and set 308*c* may perform a third analysis. Input 302 may be input to set of nodes 308*a* of trained neural network model 300. Node outputs generated by nodes 304*a-c* may be input to nodes 304*e-f*, and node outputs generated by node 304*e-f* may be input to nodes 304*g-i*. Based on the node outputs from nodes 304*g-i*, output value(s) 306 may be output by trained neural network model 300.

Intermediate representations 310*a-i* may impartially represent nodes 304*a-i*, respectively. A set of instructions 312 in a first programming language may be generated based on intermediate representations 310*a-i*. Set of instructions 312 may be stored in electronic storage 128 of client computing platform 104. Additionally, output values 318 that correspond to outcomes 320 may be stored in electronic storage 128. Set of instructions 312 may be executed by client computing platform 104 in relation to audio information 314 obtained via client computing platform 104. Thus, instruction output 316 may be generated. Upon determination that instruction output 316 is one of output values 318, the corresponding outcome 320*a* may be effectuated by client computing platform 104.

Referring back to FIG. 1, in some implementations, server(s) 102, client computing platform(s) 104, and/or external resources 124 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 124 may be operatively linked via some other communication media.

A given client computing platform 104 may include one or more processors configured to execute computer program components. The computer program components may be configured to enable an expert or user associated with the given client computing platform 104 to interface with system 100 and/or external resources 124, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 124 may include sources of information outside of system 100, external entities participating with system 100, and/or other resources. In some implementations, some or all of the functionality attributed herein to external resources 124 may be provided by resources included in system 100.

Server(s) 102 may include electronic storage 118, one or more processors 130, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 118 may comprise non-transitory storage media that electronically stores information. The electronic storage media of electronic storage 118 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 118 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 118 may include one or more virtual storage resources (e.g., cloud storage, a virtual private network, and/or other virtual storage resources). Electronic storage 118 may store software algorithms, information determined by processor(s) 130, information received from server(s) 102, information received from client computing platform(s) 104, and/or other information that enables server(s) 102 to function as described herein.

Processor(s) 130 may be configured to provide information processing capabilities in server(s) 102. As such, processor(s) 130 may include one or more of a digital processor, an analog processor, a digital circuit designed to process information, an analog circuit designed to process information, a state machine, and/or other mechanisms for electronically processing information. Although processor(s) 130 is shown in FIG. 1 as a single entity, this is for illustrative purposes only. In some implementations, processor(s) 130 may include a plurality of processing units. These processing units may be physically located within the same device, or processor(s) 130 may represent processing functionality of a plurality of devices operating in coordination. Processor(s) 130 and 120 may be configured to execute components 108, and 110, 112, 114, and/or 116, respectively, and/or other components.

Processor(s) 130 and 120 may be configured to execute components 108, 110, 112, 114, and/or 116, and/or other components by software; hardware; firmware; some combination of software, hardware, and/or firmware; and/or other mechanisms for configuring processing capabilities on processor(s) 130. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, and 110, 112, 114, and/or 116 are illustrated in FIG. 1 as being implemented within a single processing unit in processor(s) 130 and 120, respectively, in implementations in which processor(s) 130 and 120 include multiple processing units, one or more of components 108, 110, 112, 114, and/or 116 may be implemented remotely from the other components. The description of the functionality provided by the different components 108, 110, 112, 114, and/or 116 described is for illustrative purposes, and is not intended to be limiting, as any of components 108, 110, 112, 114, and/or 116 may provide more or less functionality than is described. For example, one or more of components 108, 110, 112, 114, and/or 116 may be eliminated, and some or all of its functionality may be provided by other ones of components 108, 110, 112, 114, and/or 116. As another example, processor(s) 130 may be configured to execute one or more additional components that may perform some or all of the functionality attributed below to one of components 108, 110, 112, 114, and/or 116.

FIG. 2 illustrates a method 200 to implement neural networks that have been transformed to computable functions to enhanced coordinated natural language processing by server/client systems, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include obtaining audio information that represents sounds captured by a client computing platform. The sounds convey utterances from one or more users. Operation 202 may be performed by one or more hardware processors configured by machine-readable instructions including a component that is the same as or similar to obtaining component 110, in accordance with one or more implementations.

An operation 204 may include performing analysis on the audio information to determine whether the audio information satisfies criteria for a second set of one or more processors of a client computing platform to execute a first set of instructions on the audio information. The first set of instructions may be stored in local electronic storage of the client computing platform. Operation 204 may be performed by one or more hardware processors configured by machine-readable instructions including a component that is the same as or similar to preliminary analysis component 112, in accordance with one or more implementations.

An operation 206 may include executing the first set of instructions on the audio information to generate an instruction output responsive to determination that the audio information satisfies the criteria. Operation 206 may be performed by one or more hardware processors configured by machine-readable instructions including a component that is the same as or similar to secondary analysis component 114, in accordance with one or more implementations.

An operation 208 may include determining whether the instruction output is equal to one of the output values stored in the local electronic storage. Operation 208 may be performed by one or more hardware processors configured by machine-readable instructions including a component that is the same as or similar to secondary analysis component 114, in accordance with one or more implementations.

An operation 210 may include effectuating the corresponding outcome responsive to determination that the instruction output equals one of the output values. Operation

210 may be performed by one or more hardware processors configured by machine-readable instructions including a component that is the same as or similar to outcome effectuating component 116, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to implement neural networks that have been transformed to computable functions to enhance coordinated natural language processing by server/client systems, the system comprising:

electronic storage that stores a trained neural network model and a set of output values that correspond to outcomes, wherein the trained neural network model generates an output value based on inputs, wherein the trained neural network model includes individual sets of nodes, wherein the individual sets of the nodes are configured to sequentially perform different analyses to produce separate node outputs, wherein the node outputs produced by the sets of the nodes are input to the sets of the nodes that follow;

wherein the nodes include values for node parameters and function parameters, wherein the node parameters include at least weights and a bias, wherein the function parameters include operations related to the weights and the bias, and/or one or more coefficients;

a first set of one or more processors configured by machine-readable instructions to:

analyze the trained neural network model to determine node values for the node parameters applied to the inputs at individual ones of the nodes in the sets;

analyze the trained neural network model to determine function values for the function parameters applied to the node values at the individual nodes;

generate, based on the node values and the function values, individual intermediate representations of the individual nodes, wherein the intermediate representations impartially represent the nodes and the particular analyses performed;

generate, based on the individual intermediate representations, sets of instructions in different programming languages for the individual nodes such that the sets of instructions are executable on a client computing platform, wherein the sets of instructions include a first set of instructions in a first programming language;

the client computing platform including:

local electronic storage that stores the first set of instructions and the set of output values that correspond to the outcomes; and a second set of one or more processors configured by machine-readable instructions to:

obtain audio information that represents sounds conveying utterances by a user;

perform analysis on the audio information to determine whether the audio information satisfies criteria for the second set of one or more processors to execute the first set of instructions on the audio information;

execute the first set of instructions on the audio information to generate an instruction output responsive to determination that the audio information satisfies the criteria;

determine whether the instruction output is equal to one of the output values stored in the local electronic storage; and effectuate the corresponding outcome responsive to determination that the instruction output equals one of the output values.

2. The system of claim 1, wherein the electronic storage stores trained neural network models that generate output values based on different inputs, wherein the trained neural network models include the trained neural network model.

3. The system of claim 2, wherein the different inputs include an image, a video, and/or entity classifications.

4. The system of claim 1, wherein the outcomes include command intake and individual commands.

5. The system of claim 1, wherein the instruction output includes a number, an array, and/or a multidimensional array.

6. The system of claim 2, wherein the electronic storage stores the sets of instructions in the programming languages for the individual nodes of the trained neural network model as a first collection, wherein the electronic storage stores multiple collections for the nodes of different ones of the trained neural network models.

7. The system of claim 1, wherein the electronic storage stores a list of wake words and a set of commands, wherein the criteria include utterance of one or more of the wake words and/or utterance of one or more of the commands.

8. The system of claim 1, wherein the second set of the one or more processors are further configured by the machine-readable instructions to:

responsive to determination that the instruction output does not equal one of the output values, transmit the audio information to a server for execution by the trained neural network model.

9. A system configured to implement neural networks that have been transformed to computable functions to enhance coordinated natural language processing by server/client systems, the system comprising:

a client computing platform including:

local electronic storage that stores a first set of instructions and a set of output values that correspond to outcomes, wherein the first set of instructions are a computable form of a trained neural network model, wherein the trained neural network model includes individual sets of nodes, wherein the individual sets of the nodes are configured to sequentially perform different analyses to produce separate node outputs, wherein the node outputs produced by the sets of the nodes are input to the sets of the nodes that follow;

wherein the nodes include values for node parameters and function parameters, wherein the node parameters include at least weights and a bias, wherein the function parameters include operations related to the weights and the bias, and/or one or more coefficients;

wherein the first set of instructions are generated based on individual intermediate representations of the individual nodes, wherein the intermediate representations are generated based on the values for node parameters and function parameters applied to the given input at the individual nodes so that the intermediate representations impartially represent the nodes and the particular analyses performed; and a second set of one or more processors configured by machine-readable instructions to:

obtain audio information that represents sounds conveying utterances by a user;

perform analysis on the audio information to determine whether the audio information satisfies criteria for the second set of one or more processors to execute the first set of instructions on the audio information;

execute the first set of instructions on the audio information to generate an instruction output responsive to determination that the audio information satisfies the criteria;

determine whether the instruction output is equal to one of the output values stored in the local electronic storage; and effectuate the corresponding outcome responsive to determination that the instruction output equals one of the output values.

10. A method to implement neural networks that have been transformed to computable functions to enhanced coordinated natural language processing by server/client systems, the method comprising:

analyzing, by a first set of one or more processors, a trained neural network model to determine node values for node parameters applied to given inputs at individual nodes in sets of nodes, wherein electronic storage that stores the trained neural network model and a set of output values that correspond to outcomes, wherein the trained neural network model generates an output value based on the inputs, wherein the trained neural network model includes individual sets of the nodes, wherein the individual sets of the nodes are configured to sequentially perform different analyses to produce separate node outputs, wherein the node outputs produced by the sets of the nodes are input to the sets of the nodes that follow, wherein the nodes include values for node parameters and function parameters, wherein the node parameters include at least weights and a bias, wherein the function parameters include operations related to the weights and the bias, and/or one or more coefficients;

analyzing, by the first set of one or more processors, the trained neural network model to determine function values for the function parameters applied to the node values at the individual nodes;

generating, by the first set of one or more processors, based on the node values and the function values, individual intermediate representations of the individual nodes, wherein the intermediate representations impartially represent the nodes and the particular analyses performed;

generating, by the first set of one or more processors, sets of instructions in different programming languages for the individual nodes based on the individual intermediate representations such that the sets of instructions are executable on a client computing platform, wherein the sets of instructions include a first set of instructions in a first programming language;

obtaining, by a second set of one or more processors included in the client computing platform, audio information that represents sounds conveying utterances by a user;

performing, by the second set of one or more processors, analysis on the audio information to determine whether the audio information satisfies criteria for the second set of one or more processors to execute the first set of instructions on the audio information;

executing, by the second set of one or more processors, the first set of instructions on the audio information to generate an instruction output responsive to determination that the audio information satisfies the criteria, wherein local electronic storage included in the client computing platform stores the first set of instructions and the set of output values that correspond to the outcomes;

determining, by the second set of one or more processors, whether the instruction output is equal to one of the output values stored in the local electronic storage; and effectuating, by the second set of one or more processors, the corresponding outcome responsive to determination that the instruction output equals one of the output values.

11. The method of claim 10, wherein the electronic storage stores trained neural network models that generate output values based on different inputs, wherein the trained neural network models include the trained neural network model.

12. The method of claim 11, wherein the different inputs include an image, a video, and/or entity classifications.

13. The method of claim 10, wherein the outcomes include command intake and individual commands.

14. The method of claim 10, wherein the instruction output includes a number, an array, and/or a multidimensional array.

15. The method of claim 11, wherein the electronic storage stores the sets of instructions in the programming languages for the individual nodes of the trained neural network model as a first collection, wherein the electronic storage stores multiple collections for the nodes of different ones of the trained neural network models.

16. The method of claim 10, wherein the electronic storage stores a list of wake words and a set of commands, wherein the criteria include utterance of one or more of the wake words and/or utterance of one or more of the commands.

17. The method of claim 10, responsive to determination that the instruction output does not equal one of the output values, transmitting, by the second set of the one or more processors, the audio information to a server for execution by the trained neural network model.

* * * * *